United States Patent [19]

Hullwegen

[11] 4,352,190

[45] Sep. 28, 1982

[54] DEVICE FOR AUTOMATIC EQUALIZATION OF ELECTRICAL DATA TRANSMISSION CHANNELS

[75] Inventor: Josef Hullwegen, Altenbeken, Fed. Rep. of Germany

[73] Assignee: Nixdorf Computer AG, Paderborn, Fed. Rep. of Germany

[21] Appl. No.: 205,037

[22] Filed: Nov. 7, 1980

[30] Foreign Application Priority Data

Nov. 9, 1979 [DE] Fed. Rep. of Germany ....... 2945332

[51] Int. Cl.³ .................... H04L 25/03; H03K 5/135
[52] U.S. Cl. ........................................ 375/14; 333/18
[58] Field of Search ............. 375/11, 12, 14; 333/18, 333/28 R; 364/724; 179/170.8

[56] References Cited

U.S. PATENT DOCUMENTS 3,755,736  8/1973  Kaneko et al. ..................... 333/18

Primary Examiner—Jin F. Ng
Attorney, Agent, or Firm—Krass, Young & Schivley

[57] ABSTRACT

A device for the automatic equalization, on the receiving side, of digital data signals, in which, after amplitude stabilization, the input signal is fed to a synchronizing unit and a clock signal generating unit, a distortion measuring unit and a controllable equalizer unit in which the distortion measuring signal is fed to the equalizer as a control signal. The output signal of the equalizer is then normalized in amplitude. The equalization measuring unit consists of a squaring or rectifier unit, a clock filter for the zero transition region and an integrator. Equalizers with different characteristics and their circuits are represented. The amplitude stabilization on the input side may be supplemented by an amplitude-controlled pre-equalization (FIG. 1).

7 Claims, 9 Drawing Figures

DEVICE FOR AUTOMATIC EQUALIZATION OF ELECTRICAL DATA TRANSMISSION CHANNELS

DESCRIPTION

1. Technical Field

This invention relates to a device for the automatic equalization on the receiving side of any electric data transmission channel including an equalizer which can be set by means of a regulating signal, and a regulating signal generating unit.

2. Background Art

In the transmission of the data signals on transmission channels, e.g. telephone lines, because of the frequency-dependent attenuation and group delay properties of the transmission channels, distortions occur in the transmitted signals, which depend in particular on the properties of the transmission channel, on the speed of transmission and type of the signals transmitted. To equalize the distorted data signals, equalizers are known which, in the case of a permanently connected transmission channel, have firmly set properties compensating for the properties of the transmission channel. Manually adapted and automatically adapted equalizers are also known.

An automatic attenuation equalizer is known from the journal, "Unterrichts-blatter der Deutschen Bundespost," Chapter B. Fernmeldewesen, 30th year, No. 4, Apr. 10, 1977, pp 152-3. The known attenuation equalizer includes a transistor in a grounded emitter circuit, to which emitter's resistance is connected in parallel the series circuit consisting of a capacitor and the channel of a field-effect transistor. In this way a frequency-dependent negative feedback arises, which can be varied through the control voltage on the gate of the field-effect transistor. This attenuation equalizer is suitable only for those cases in which the distorting transmission channel is fed with a prescribed transmission level. From the received signal level, which is in turn a measure of the attenuation of the transmission channel, the control voltage for the attenuation equalizer and for an AGC amplifier connected before this is derived in the receiver. The AGC amplifier makes sure that the subsequent stages are always presented the same signal voltage independently of the attenuation of the transmission channel. The automatic equalizer is set to a point on the characteristic corresponding to the received voltage, as a function of the regulating signal. When the transmitting level is variable, this automatic attenuation equalizer is not suitable. It is also not suitable when the transmission channel no longer gives merely negligible group delay distortions, as is the case for example in coil loaded circuits. A further disadvantage of this known attenuation equalizer is that with the usual switching in of resistance attenuators, which affect only the amplitude, for testing a line, the equalizer is set falsely by the regulating signal.

Adjustable equalizers for equalizing the received data signal in its frequency range and in its time range are known from the book, "Datenubertragung" by P. Bocker, Volune I, Grundlagen, Springer-Verlag, pp. 210-225. Here the equalization takes place with the aid of a transversal filter, the coefficients of which are automatically set with the aid of an error function. For the setting, a pseudorandum bit is used which is obtained by means of a scrambler and can be placed ahead of the message or can be transmitted as a regulating signal is addition to the message, as is known from German Offenlegungsschrift No. 28 50 718. In the latter case the setting criterion is the difference between the received distorted regulating signal and a standard signal generated in the receiver which is the same as the undistorted regulating signal. In all these known cases, the automatic setting of the equalizer or of the coefficients of the transversal filter requires not only considerable time but also a high circuitry expenditure.

BRIEF SUMMARY OF THE INVENTION

It is the object of the invention to provide a data channel equalization device which brings about a satisfactory equalization with a comparatively low expenditure of circuitry.

This is accomplished according to the invention by a attenuation equalizer having frequency-dependent feedback amplifiers, the frequency characteristic of which can be varied in magnitude and/or phase with the use of an adjusting signal or regulating signal. Contrary to the state of the art, however, this regulating signal is influenced by the quality of the equalization, and in this way the equalization is optimized.

The invention as well as the advantages arising from it are explained in detail in the following on the basis of the drawings.

DETAILED DESCRIPTION OF THE PREFERRED EMBODIMENTS

Figure 1:
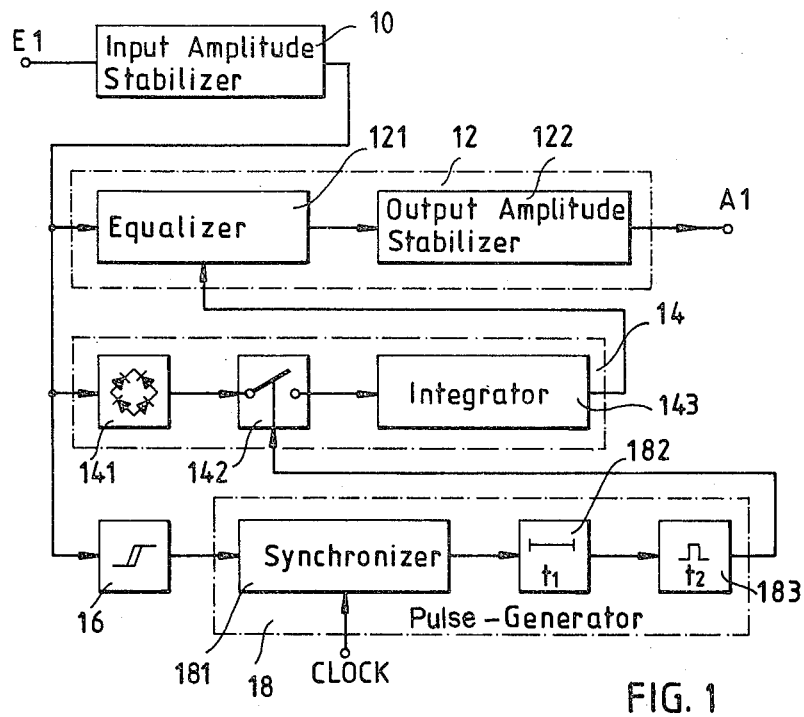
FIG. 1 shows a block circuit diagram of one embodiment of the device according to the invention.

The block circuit diagram of FIG. 1 represents part of a receiver where distorted, possible already demodulated data signals are found at the input $E_1$ and the equalized data signals are given off at the output $A_1$. The distorted data signals from the input $E_1$ go first to an input AGC amplifier 10, the function of which is to emit a signal with constant amplitude at its output to eliminate the line attenuation and to compensate for any possible false feed level. The output of the input AGC amplifier 10 is connected with the input of the equalizer 12, the input of a regulating signal generating unit 14 and the input of a switch with a symmetrical threshold level at its input 16. The equalizer 12 here includes the equalizer device 121 and an output AGC amplifier 122 connected at the output side of this, the output of which amplifier is connected with the output terminal $A_1$. The output AGC amplifier serves to normalize the amplitude of the equalized data signal.

Figure 2:
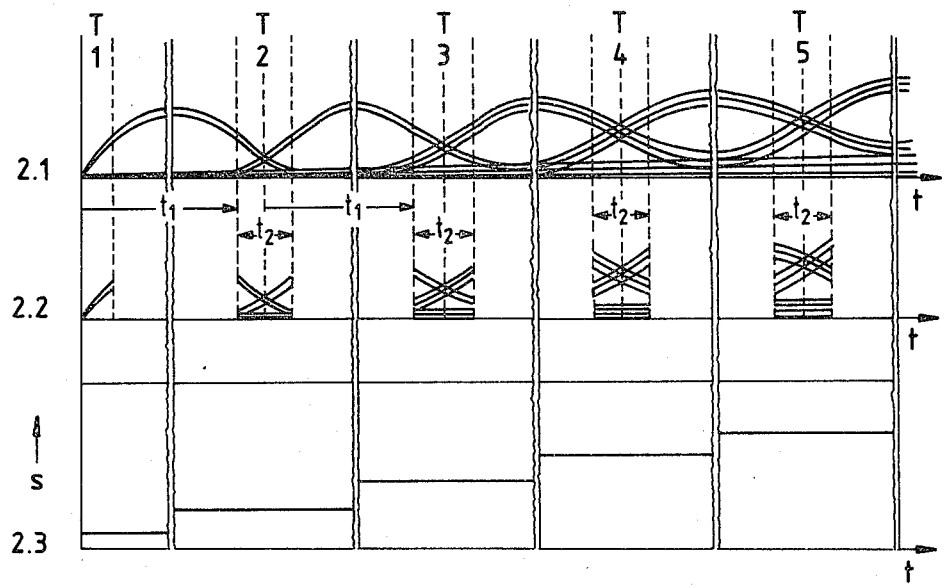
FIG. 2 shows a series of diagrams 1 to 5, independent of one another, for explaining the fundamentals of the generation of the regulating signal according to the invention.

The regulating signal generating unit 14 includes a rectifier unit 141, which may be replaced by a squaring unit, a controlled switch 142 and an integrator 143. The switch 16 has a clock signal generator unit 18 connected at its output side, which generates clock pulses, explained in more detail below, for triggering the switch 142. The switch 16 first generates square-wave signals from the data signals received, which square-wave signals are fed to a synchronizing unit 181 of the clock signal generator unit 18. To the input designated as "clock," an operating clock or timing signal is fed to the synchronizing unit from a clock generator, not represented. With the aid of a control unit which will not be described further here, the synchronizing unit generates clock signals, one switching edge of which coincides with one momentary ideal point in time of the zero transition of the data signal received. The ideal point in time of the zero transitions is understood to mean the point in time at which the zero transitions would occur with an optimally equalized data signal. The distance between two ideal points in time accordingly corresponds to the duration of a basic time interval of the data signal. In FIG. 2 these ideal points in time are characterized at T. The synchronizing unit 181 has a delay network 182 connected to it at the output side, which causes a delay of the output pulses of the synchronizing unit by the amount of $t_1$ (see also FIG. 2). The delayed pulses then go to a monostable circuit or a pulse-forming unit 183 which emits output pulses with a duration of $t_2$ for controlling the switch 142. The duration $t_2$ of this pulse and the delay time $t_1$ are so proportioned that the clock pulses controlling the switch 142 fall symetrically around the ideal point in time T, as can be seen from FIG. 2.

FIG. 2 shows different diagrams 1 to 5 which, be it noted, are entirely independent from one another. These involve respectively a segment of signals occurring in the course of a number of scanning periods of the switch 142 at the output of the rectifier unit 141 with a different degree of distortion which increases from diagram 1 to diagram 5. This signal representation, known as "eye diagram" without the rectification done in the present case, makes it possible to judge the extent of the distortions to be eliminated. With an undistorted data signal, the individual signals at consecutive times intersect at the zero line, as is the case in diagram 1. The greater the deviation of the individual signal zero transients are from the ideal intersection point on the zero line, the more intense the distortions are. A measure of this deviation is the sum of the voltage-time areas shown between the individual signals and the zero line during the time range $t_2$ around the ideal point in time T after the rectification done according to the invention. The integrator 143 serves for determining this sum, where the switch 142 in each case lets through only a segment of the rectified signal corresponding to the time span $t_2$ and the integration time of the integrator amounts to a plurality of scanning periods, in order to obtain a suitable mean value as a regulating signal.

In FIG. 2 under 2.2 are represented the signal curve shapes variously fed to the integrator 143 by means of the switch 142 over a plurality of scanning periods. This, as in the representation under 2.1, variously involves the superposition of the signal curve shapes during a plurality of scanning cycles of the switch 142. The regulating signal S occurring at the output of the integrator 143 is shown for the different cases 1 to 5 under 2.3 in FIG. 2. It is recognized that integration over a plurality of scanning periods leads to a larger or smaller regulating signal S, depending on the intensity of the distortion. With a suitable choice of the time constant, the integrator causes the regulating signal S to be continuously fed to the regulating input of the equalizer device 121 and not drop back to zero or a low value after individual integration process. This can be achieved by having the integrator 143 constructed as a delay member with a relatively large time constant, as is the case, recognizable to one skilled in the art, in the circuit according to FIG. 3.

The rectifier unit 141 is required because an increase in the voltage time areas in the positive and negative part of the eye diagram as a result of the deviation, due to distortion, despite differing distortions, cound lead to hardly distinguishable regulating signals by integration. It is clear that a squaring unit may be used just as well in place of the rectifier unit 141.

In the embodiment represented in FIG. 1, the equalizer, dependent on the distorted data signals, is set so that the distortions are compensated for. Thus a control is involved. It is also conceivable to regulate the equalizer when the rectifier unit 141 is not acted on by the distorted data signals but rather by the equalized data signals from the output $A_1$. The equalizing device 121 would then have to alter its setting until the output signal of the integrator 143 is zero or has a minimal value. It can also be advantageous to connect the input of the switch 16 to output $A_1$ instead to the output of the input AGC amplifier 10. It is easily seen that the clock signals can be derived from the equalized data signals with a greater accuracy than from the distorted data signals.

Finally, the representation in FIG. 1 relates to the case where the equalizer is acted on by the baseband signals, and an equalization in the time range occurs. In a case where the data to be transmitted, for their transmission over long range telephone channels for example, are converted by modulation into signals which are transmittable through a voice channel, an equalization can also be provided in the frequency range, that is, the equalizer can be connected before a demodulator (not shown). For this case it is obvious that the clock generator unit 18 and the regulating signal generating unit 14 are no longer connected in parallel with the equalizer 12, but rather are acted on by the equalized and thereafter demodulated signal.

Figure 3:
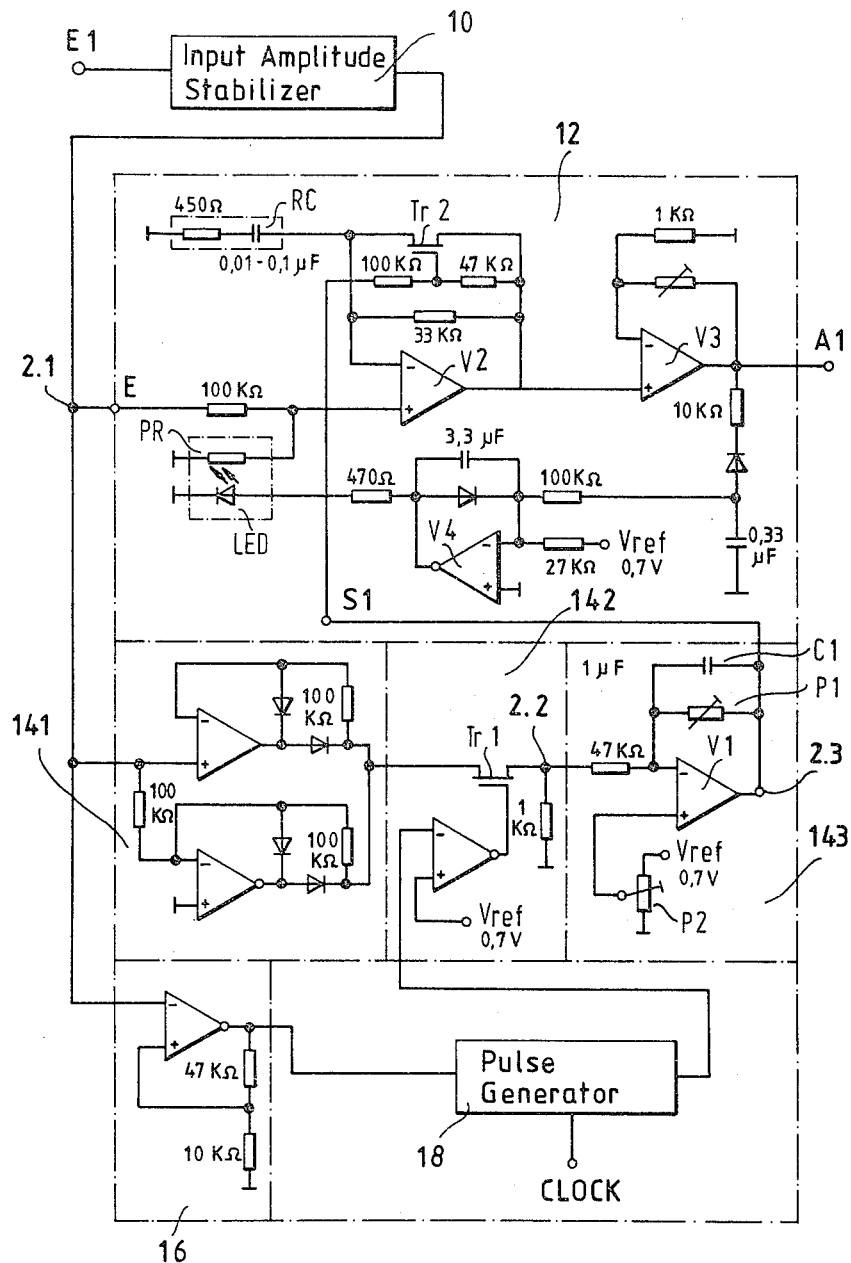
FIG. 3 shows a more detailed circuit of the block circuit diagram of FIG. 1 with proportioning examples.

FIG. 3 shows the arrangement according to FIG. 1 with a detailed representation of the equalizer 12 and of the regulating signal generator unit 14. The specified proportioning of the circuit elements applies here as it also does in FIG. 4 for the case of the ordinary telephone line or coil loaded lines and is obviously to be considered as a possible example. The circuit of FIG. 3 is easily understood by one skilled in the art, by reason of the above explanation, so that as regards details of the circuit, reference will be made expressly to the representation and only a few special features will be discussed. The circuit is constructed in an easily integratable form and has a MOS field-effect transistor $Tr_1$ as the actual switching member of the switch 142. The "integrator" 143, designed here as a delay member, includes a feedback amplifier $V_1$, the feedback branch of which shows the parallel circuit of a capacitor $C_1$ with a potentiometer $P_1$. The noninverting input of the amplifier $V_1$ is acted on by way of a potentiometer $P_2$ with an adjustable reference voltage. The amplification factor can be set with $P_1$, which represents a certain proportional range. The starting value can be set with $P_2$.

The equalizer 12 contains the amplifier $V_2$, connected according to the diagram, the field-effect transistor $Tr_2$ of which, located in the feedback circuit, is acted on by the output voltage of the amplifier $V_1$ by way of a voltage divider. The voltage divider at the gate of the transistor $Tr_2$ brings about a linearization of the transistor characteristic by means of a slight feedback voltage, whereas the 33K resistance connected in parallel to the transistor causes a limitation of the amplification. Depending on the conductivity state of the transistor $Tr_2$, the amplifier $V_2$ in connection with the RC network has a certain attenuation equalizer characteristic. Connected at the output side of the amplifier $V_2$ there is an amplifier $V_3$ as buffer amplifier, the output of which, connected with the output terminal $A_1$, makes the equalized data signal available in a sufficient amplitude. In order that the amplitude of this signal will not vary as a function of the equalizer setting, a gain control is provided in the embodiment of the invention shown is FIG. 3. An amplifier $V_4$, acted on by the signal at the output terminal $A_1$ and connected as an integral controller, is connected at its output with the light emitting diode of an optical coupling device. The photo resistor PR of the optical coupling device together with a 100K resistance forms a voltage divider at the input of the amplifier $V_2$. Instead of the optical coupling device, a field effect transistor could also be used, the gate voltage of which could be delivered from the amplifier $V_4$ by way of a matching stage.

Figure 4:
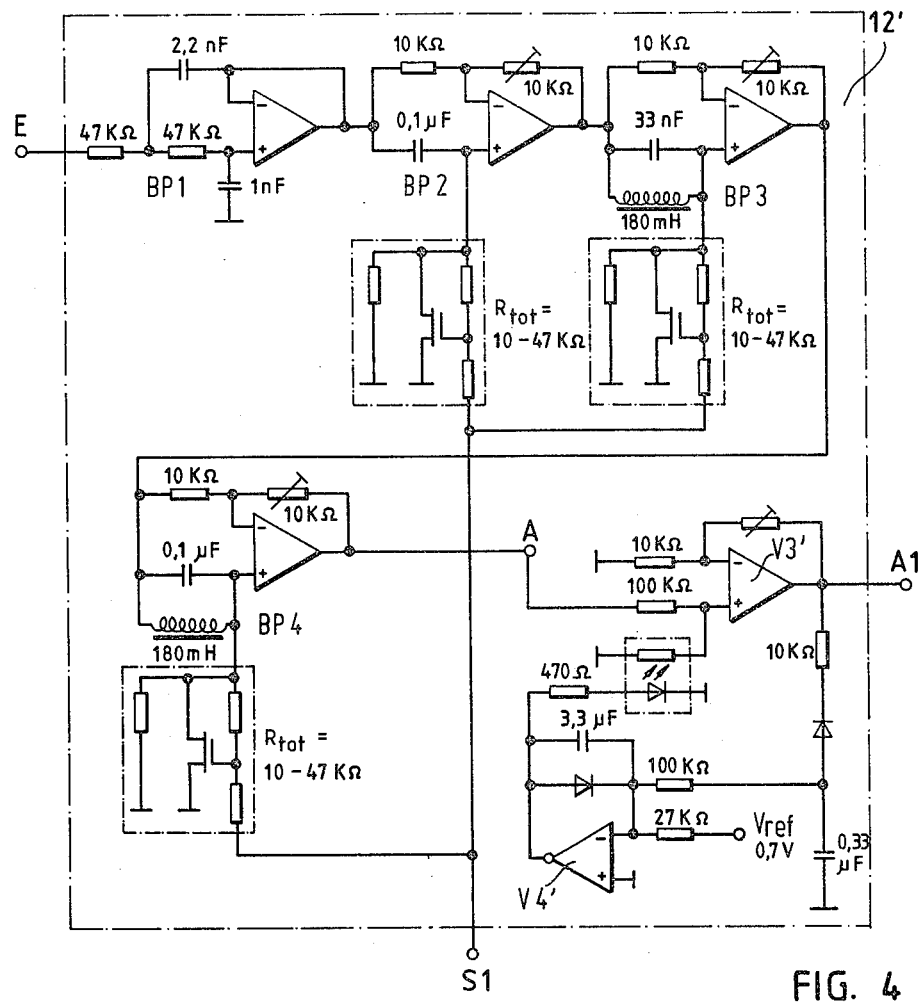
FIG. 4 shows a different embodiment of the equalizer, likewise with a proportioning example.

FIG. 4 shows a possible example of an equalizer 12' for delay equalization. This equalizer 12' could be used instead of the equalizer 12 in the circuit of FIG. 3, the similarly designated terminals of the equalizer 12', whose amplifiers $V_3'$ and $V_4'$ correspond to the amplifiers $V_3$ and $V_4$ of the equalizer 12 of FIG. 3, includes a cascade connection of four feedback frequency dependent amplifiers between its input terminal E and the input of the amplifier $V_3'$, where the feedback in three of these amplifiers is controllable by means of the regulating signal on the terminal S1. Moreover, regarding FIG. 4, reference can be made to the easily understandable representation of the circuit details without it appearing necessary to enumerate in detail here the individual elements of the circuit and the manner in which they are connected up. Three field effect transistors switched in parallel serve as regulating elements controlled by the regulating signal.

Figure 5:
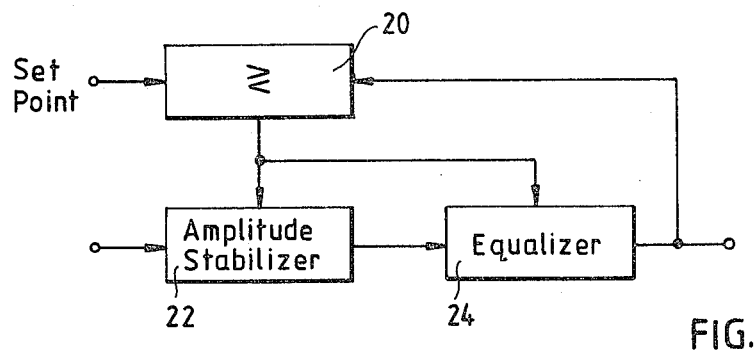
FIG. 5 shows a block circuit diagram of an inherently known attenuation equalizer, which can be used instead of the input AGC amplifier of FIG. 1, especially in connection with an equalizer according to FIG. 4.

The arrangement according to the block diagram of FIG. 5 can replace the input AGC amplifier 10 in FIG. 1 (in connection with FIG. 3 or especially with FIG. 4). This circuit is known to be suitable for the case where the transmission level is fixed and known by the receiver, so that the attenuation can be determined from the received signal level. For this a comparator 20 is used which compares the ideal level with the actual receiving level and controls an AGC amplifier 22 and an attenuation equalizer 24 independently of any deviation. The automatic gain control amplifier insures that the subsequent stages are always offered the same voltage regardless of the attenuation of the transmission channel. At the same time, the automatic attenuation equalizer is set for the equalizer curve corresponding to the receiving level. In particular, in data transmission by way of coil loaded lines a successive equalizer according to FIG. 4 may additionally take care of the delay equalization.

Figure 6:
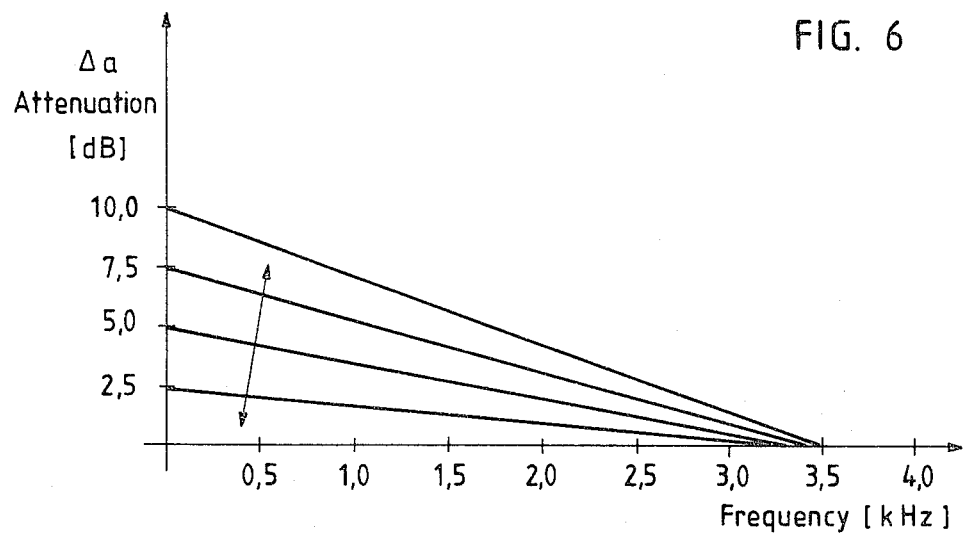
FIG. 6 shows the attenuation characteristic and operating range of the equalizer for the case of an ordinary telephone cable or coil loaded wires and the proportioning specified in FIG. 3.
Figure 7:
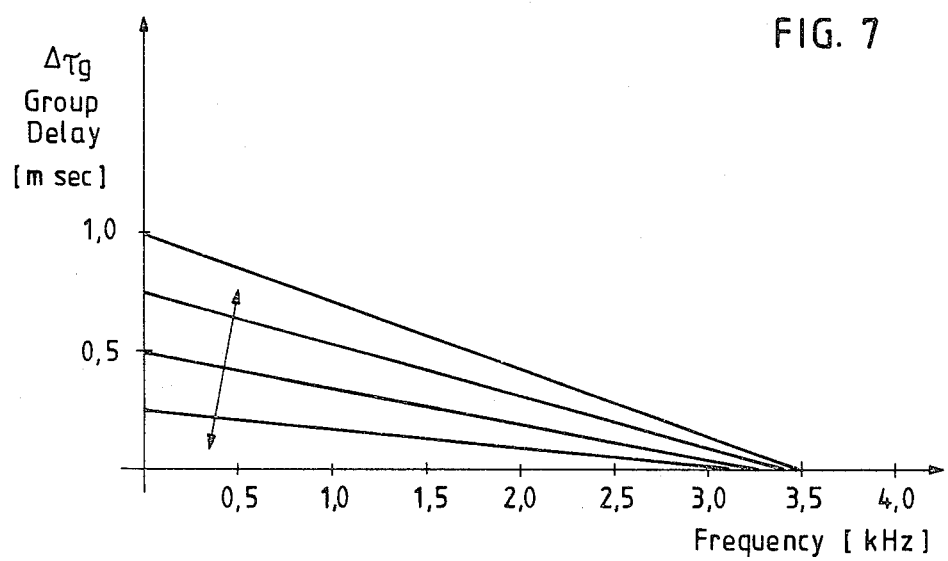
FIG. 7 shows the characteristic and the operating range of the delay equalizer with the proportioning given in FIG. 4.

FIG. 6 shows the equalizer curves of the equalizer of FIG. 3, where the double arrow designates the control region. These equalizer curves are suitable for equalizing ordinary telephone lines. FIG. 7, shows the equalizer curves of the equalizer according to FIG. 4, where the control region is also designated with a double arrow. These equalizer curves are suitable for the delay equalization of ordinary coil loaded cables.

Figure 8:
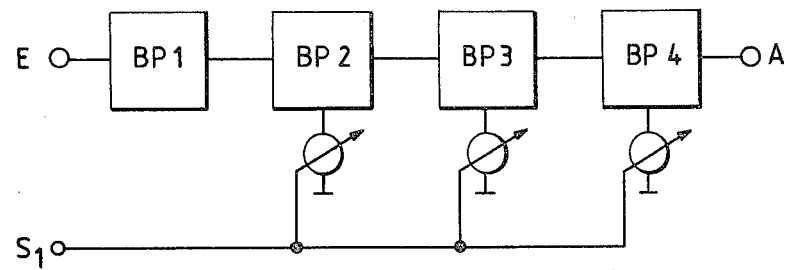
FIGS. 8 and 9 show equivalent series and parallel arrangements of band-pass stages for forming an equalizer of the type shown in FIG. 4.
Figure 9:
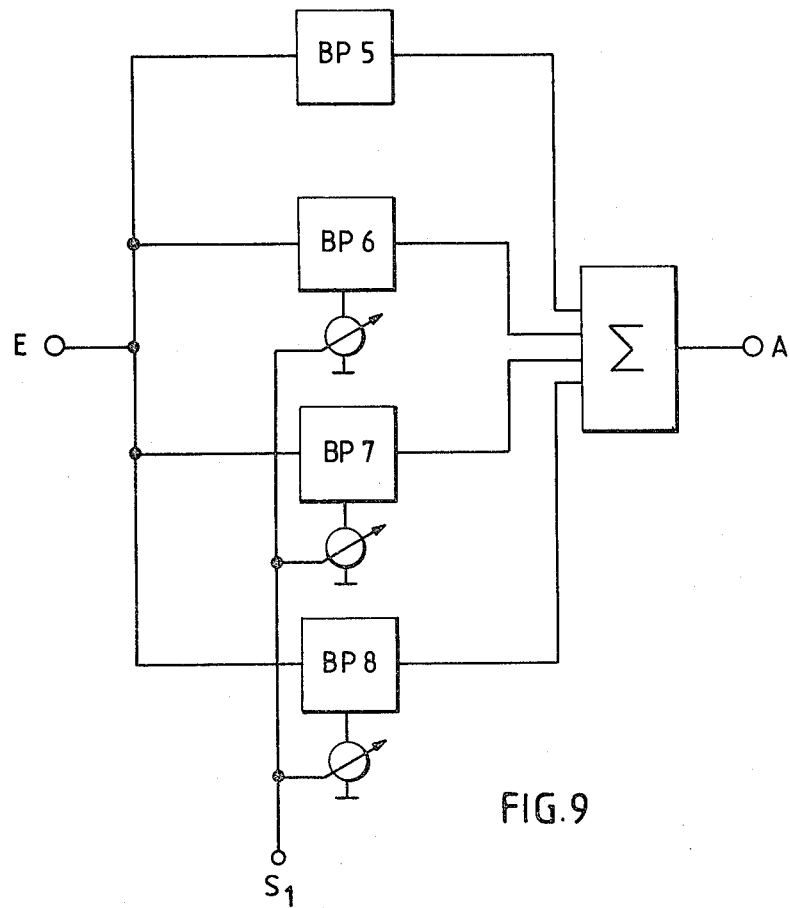

In FIG. 8 a block representation of the equalizer according to FIG. 4, is shown which makes clear the series connection of the individual band pass stages BP1 to BP4. Here the regulating element to be triggered with a regulating signal by way of the input $S_1$ is also shown for each band pass BP2, BP3, BP4, which element according to FIG. 4 respectively consists of three resistances and one transistor. FIG. 9 shows an equivalent arrangement of four band pass stages BP5 to BP8 in a parallel connection, whereby the output signals of these band pass stages are combined in a summing circuit, the output of which in turn forms the circuit output A. In the parallel circuit the band pass stages as well as the related regulating elements must be proportioned differently from the summing circuit. It is possible to gain corresponding results with the two circuit principles shown in FIGS. 8 and 9.

I claim:

1. A device for the automatic equalization of an electrical data signal of the type having zero level transitions comprising:
   an equalizer unit having an input connected to receive said data signal, an output for said data signal after equalization, and a control input for receiving a regulating signal;
   a regulating signal generator having an input connected to receive the data signal and comprising a rectifier unit, an integrator having an input, an output, and an integration time corresponding to a multiple of the basic interval between zero level transitions of the data signal, and a switch connected in series between the rectifier and the integrator input and adapted to be controlled by a clock signal for periodic, transient feeding of the rectified data signal to the integrator;
   a clock signal generator having an input connected to receive the data signal and responsive thereto to produce a clock signal output synchronized with the ideal points in time of said zero level transitions; said clock signal output being connected to the switch to control said periodic, transient feeding;
   the integrator output being connected to the control input of the equalizer unit.

2. Apparatus as claimed in claim 1 wherein the clock signal output contains clock pulses each of which has a width equal to or less than a step interval and symmetrical to an ideal point in time of the zero level transitions.

3. Apparatus as defined in claim 2 further comprising an AGC Amplifier connected between a data signal source and the inputs of the equalizer unit, the regulating signal generator and the clock signal generator and having an output level which is independent of the attenuation of the transmission channel.

4. Apparatus as defined in claim 3 wherein the equalizer is a delay equalizer.

5. Apparatus as defined in claim 1 wherein the equalizer is an attenuation equalizer.

6. Apparatus as defined in claim 1 wherein said equalizer is an amplifier the frequency characteristic of which is controllable with respect to the magnitude and/or phase of the regulating signal.

7. Apparatus as defined in claim 1 wherein the integrator is connected as a delay line with a time constant large compared to the switching period of the switch.

* * * * *